United States Patent [19]

Weiss

[11] 4,207,289

[45] Jun. 10, 1980

[54] SAMPLE TUBE HOLDER

[76] Inventor: Michael D. Weiss, 6770 SW. 122 Dr., Miami, Fla. 33156

[21] Appl. No.: 921,725

[22] Filed: Jul. 3, 1978

[51] Int. Cl.[2] .................................................. G01N 1/10

[52] U.S. Cl. .................................. 422/104; 23/230 R; 211/74; 422/65; 422/67; 422/102

[58] Field of Search ........................ 422/63, 65, 66, 67, 422/102, 104; 211/74; 23/230 R

[56] References Cited

U.S. PATENT DOCUMENTS

| | | | |
|---|---|---|---|
| 3,713,771 | 1/1973 | Taylor et al. | 422/104 X |
| 3,948,606 | 4/1976 | Johnson | 422/104 |
| 3,993,452 | 11/1976 | Moulding | 422/104 X |
| 4,039,286 | 8/1977 | Keller et al. | 422/66 X |

*Primary Examiner*—R. E. Serwin
*Attorney, Agent, or Firm*—Jack E. Dominik

[57] ABSTRACT

Apparatus and Method for memory organization of samples are disclosed. Elongated, compartment-free channels are provided for slidably receiving sample tube containers and associated sample tubes therein. Each channel is provided with excess physical space, along its longitudinal dimension, thus permitting the separation of groupings of sample tube containers from other sample tube containers undergoing the same or different series of tests.

6 Claims, 3 Drawing Figures

SAMPLE TUBE HOLDER

BACKGROUND OF THE INVENTION

1. Field of the Invention

This invention relates generally to devices for holding sample tubes and more particularly relates to an apparatus which allows the user thereof to physically separate groupings of sample tubes by a simple manual operation, thus eliminating the need to otherwise record the history of the manipulations applied to the samples contained within the said sample tubes.

2. Description of the Prior Art

Hospitals, clinics and research laboratories utilize differing types of sample tube holders, the design of which depends upon the purpose sought to be accomplished. Examples of holders for samples to be centrifuged are found in U.S. Pat. Nos. 3,674,198 issued July 4, 1972; and 4,057,148 issued Nov. 8, 1977. An example of a holder designed to hold containers and associated tubes in linear or curved arrangement, thus facilitating systematic organization of samples, is found in U.S. Pat. No. 3,713,771 issued Jan. 30, 1973. Devices primarily concerned with providing identification labels or coding elements for each sample tube are found in U.S. Pat. Nos. 3,905,772 issued Sept. 16, 1975; 3,905,482 issued Sept. 16, 1975; and 3,604,566 issued Sept. 14, 1971. An example of a holder formed by folding a sheet like material, such as cardboard, is found in U.S. Pat. No. 3,923,160 issued Dec. 2, 1975.

All of these devices are designed to facilitate the handling, arrangement and transportation of sample tubes and most of these prior art devices are designed to clearly identify, by color coding or labeling, the contents of each tube. All of the prior art devices are characterized by rigid compartments adapted to receive but one sample tube per compartment, and are further characterized by the use of labels and other color coding devices to identify the contents of each tube within an associated compartment. The function of the labels and the color coding elements is to provide the user of the apparatus with a record of what manipulative steps have been applied to the sample contained within the associated sample tubes. Thus, the history or the status of the series of tests being applied to the sample is remembered in the form of labels or color codes, each said label or color code being in registration with the sample tube to which it applies. Thus, each sample tube is constrained within a rigid compartment, and each label or color code is positioned in registration with the fixed position compartment and associated tube.

SUMMARY OF THE INVENTION

These and other objects, features and advantages of the invention are accomplished by the sample tube holder disclosed herein. A sample tube holder is disclosed which provides a hollow, lidless casing which is subdivided into a plurality of elongated channels. Sample tube containers, each adapted to receive a sample tube therein, are slideably received into each channel, each container being positioned at any number of points within an associated channel. Physical space, along the longitudinal dimension of each channel, is provided, thus allowing groupings of sample tube containers to be separated by physical spacing from other groupings of sample tube containers. Thus, the user of the invention is provided with an apparatus and method whereby a record of the manipulative steps applied to the contents of each sample tube held within each sample tube container, is provided. The record takes the form of a physical arrangement, in lieu of other coding or labeling methods.

It is therefore an object of the present invention to provide a sample tube holder capable of providing a memory arrangement of the tubes independent of the use of labels and color codes.

It is a further object of the invention to provide a sample tube holder capable of slideably holding sample tubes within elongated, compartment-free channels, thereby providing an infinite number of positions, within the said channel, in which to place any selected sample tube.

These and other objects are accomplished by a construction which is economical to manufacture, assemble and maintain, due to its structural simplicity, and by a method, the steps of which are easy to follow, and which reduces or eliminates human error in mis-labeling the sample tubes.

These and other objects, and the novel details of the construction of the preferred embodiment of the invention, will become more apparent as this description proceeds, especially when considered in connection with the accompanying drawings.

BRIEF DESCRIPTION OF THE DRAWINGS

These and other objects, features and advantages of the invention will be more fully appreciated with reference to the accompanying figures.

DESCRIPTION OF THE PREFERRED EMBODIMENT

Figure 1:
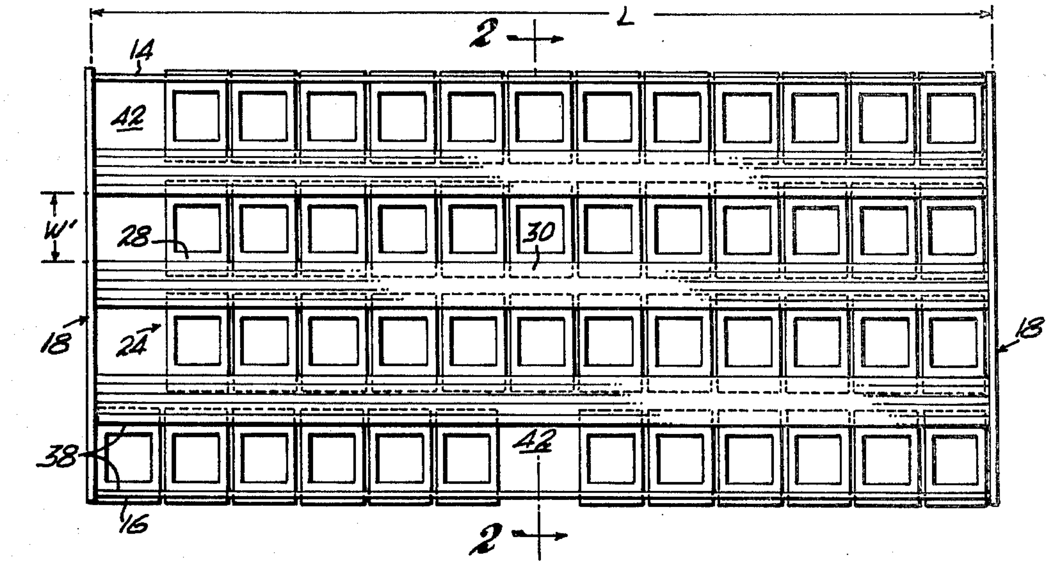
FIG. 1 is a top plan view of the sample tube holder constructed in accordance with the preferred embodiment of the present invention, showing a plurality of sample tube container members positioned within the elongated channels, and further showing the excess physical space provided within each of said channels.
Figure 2:
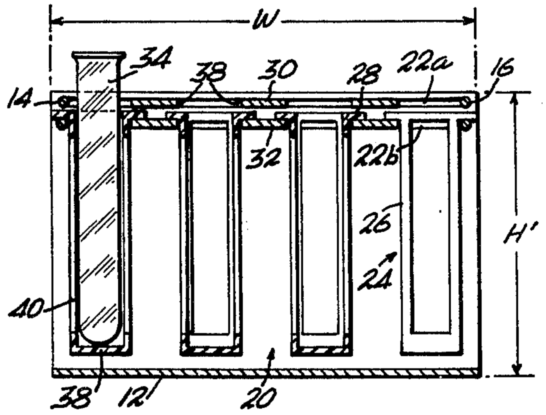
FIG. 2 is a vertical section taken along line 2—2 in FIG. 1, showing a sample tube received within a sample tube container member.
Figure 3:
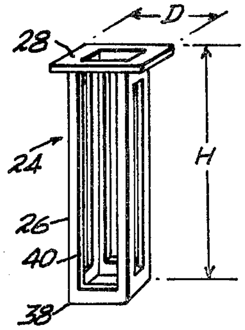
FIG. 3 is a perspective view of an embodiment of the sample tube container member.

An elongated casing member 10 is disclosed, comprising a bottom plate 12, a rear wall 14, a front wall 16, and opposing side walls 18. The said walls have inner and outer faces, are mounted about the preiphery of the said bottom plate, project upwardly therefrom, and define a cavity 20 therebetween.

Spaced downwardly from the uppermost ends of the said opposing side walls and formed integrally with each inner face of said side walls, is an upper and lower pair of horizontally disposed elongated recesses, or grooves, 22 A and B, spaced-apart in vertical relationship, each to the other. The length of said grooves is substantially equal to the width W, of the said casing member 10.

Said pair of upper and lower recesses 22 A and 22 B, formed integrally with the inner faces of said opposing side walls 18, are adapted to receive, at any selected point along their respective longitudinal dimensions, a corresponding pair of upper and lower generally flat, elongated racks, 30 and 32. The free ends of said upper and lower racks are engaged by the corresponding recesses 22 A and 22 B provided for said purpose on said inner faces of said opposing side walls 18. The upper and lower pair of racks 30 and 32 thus bridge the cavity 20, in axial alignment with the said elongated casing member 10. A multiplicity of said upper and lower pairs of racks 30 and 32 is provided, each pair being suspended across the cavity, in parallel, coplanar, spaced-apart relationship. A plurality of elongated channels 38 is thus defined between each set of pairs of racks 30 and 32. The distance between each set of pairs of upper and lower racks 30 and 32, being the width W' of said elongated channels 38, is greater than the width of the container body member 26 hereafter described, but less than the diameter D of the container flange member 28 hereafter described.

A container member 24 is disclosed, comprising a container flange member 28 and a container body member 26 depending therefrom. The container body member comprises a bottom plate 38 and side walls 40 mounted about the periphery of said bottom plate and extending upwardly therefrom. The said flange member is formed integrally with the uppermost ends of said side walls and project outwardly therefrom on a horizontal plane.

The body member 26 which depends from the flange member 28, has a depth H which is less than the depth H' of the casing member 10, and is adapted to receive a sample tube 34 therein.

In the construction of the invention, the free ends of the lower sets of racks 32 are first brought into registration with lower recesses 22B, and are spaced in equi-distant parallel relationship with each other. The container members 24 are then manually inserted into the elongated channel members 38 defined by said parallel racks 32. Each set of lower racks 32 engages the opposing flange members 28 of associated container members 24, thereby suspending associated container members within associated elongated channels 38. The final step in constructing the invention is the insertion of the free ends of the upper sets of racks 30 into the associated upper recesses 22A in vertical coaxial spaced-apart relationship with the lower sets of racks 32. Thus, the said upper sets of racks act to constrain the movement of the container member 24 within the longitudinal dimension of the associated elongated channel members 38. Each container can be slideably positioned at any number of points along the longitudinal dimension of an associated elongated channel 38. Of course, the number of positions that each container member 24 may assume within its associated elongated channel member 38 is reduced as additional container members 24 are introduced into the channel 38. Consequently, the capacity of each channel 38 to receive individual container members 24 is not exhausted when the invention is constructed. The memory feature of the invention, hereafter described, is dependent upon this non-exhaustion of each channel's container receiving capacity. Thus, in the preferred embodiment of the invention, the length L of each channel is greater than the sum of the diameters D of the individual container flange members received therein. A physical space 42 is thereby provided within each associated channel along its longitudinal dimension.

The said physical space 42 provides an infinitely divisible barrier which is used, according to the disclosure hereby provided, to segregate groupings of sample tubes from other tubes undergoing the same or different series of tests, by physically spacing apart within an associated channel, said tubes from said differing tubes.

In another embodiment of the invention, said flange members are bracket shaped and thus engage said lower racks 32, thereby enabling the container member to be slideably and suspendedly positioned along the longitudinal dimension of said channels, independent of the use of said upper recesses 22A and upper racks 30.

Another embodiment of the invention, not shown, is provided with a casing frame, not shown, without walls or bottom plates, in lieu of the casing (10) having rear wall 14 front wall 16, and side walls 18, and bottom plate 12 as described heretobefore. Thus, the use of the wall-less and bottom plate-less casing frame provides the user thereof with an unobstructed field of view of the sample tube containers 24 and associated sample tubes 34 received therein. The suspension members 32, in this embodiment, are supported by frame members, not shown, disposed along the vertical and horizontal edges of the casing member 10, heretofore described. In this embodiment, the bracket-shaped flange member is employed, eliminating the need for constraining members 30. The suspension members 32 are fixedly secured, at opposing ends thereof, to the frame members, not shown, disposed along the uppermost edges of the removed side walls 18.

In another embodiment of the invention, side wall 40 of said container member 24 are removed, leaving frame members disposed along the associated edges of said removed side walls 40, thereby promoting visual observation of the sample tubes 34 received within the associated sample tube containers 24.

Those familiar with assaying are cognizant of the difference between identifying the known preparations prior to the commencement of manipulative steps thereon, and identifying which preparations thereafter were the subject of manipulations. The spacing technique disclosed herein is directed to accomplish the latter object, independent of color coding and other labeling devices. It is therefore understood that another embodiment of the invention, which is hereby disclosed, employs color codes or labels for the purpose of identifying the known preparations prior to the commencement of the manipulative steps thereon. Each said color code or label is fixedly secured to an associated sample tube container by suitable means, and disposed upon each said container in a position exposed to the field of view of the user of the apparatus.

The method by which the objects of the invention are achieved comprises the steps of positioning sample tubes which are received within associated sample tube containers, or groupings thereof, the contents of which have undergone certain manipulations, at selected positions within an associated elongated channel, separate and apart from other sample tubes contained within other associated sample tube containers that are undergoing either different stages of the same test or all together different tests.

The preferred method contemplates the use of separate channels for containers undergoing different tests, and further contemplates the segregation, within an associated channel, of containers undergoing the same test, whereby the exercise of a manipulative step upon the contents of a sample tube held within a sample tube container would mandate the user of the method disclosed hereby to slide said container to one end of the elongated channel, thus physically separating it from the containers the contents of which have not yet undergone said manipulation. In this manner, the user of the invention is afforded a history of a series of tests being applied to the contents of the individual sample tubes, upon visual observation of the physical arrangement of the containers held within the elongated channels.

Although particular embodiments of the invention have been shown and described in full here, there is no intention to thereby limit the invention to the details of such embodiments. On the contrary, the intention is to cover all modifications, alternatives, embodiments, usages and equivalents of the subject invention as fall within the spirit and scope of the invention, specification and the appended claims.

What is claimed is:

1. A sample tube holder, comprising, in combination, a frame structure defining at least one elongate channel, a plurality of sample tube receiving containers adapted to be slideably positioned within said elongate channel, a portion of said channel being empty when said containers are positioned within said channel so that a sample tube-receiving container or group of containers may be physically separated, when the contents of said sample tube or tubes have been manipulated, from the other containers in such channel the contents of which have not been manipulated, said frame structure being lidless so that the manipulation of sample tube contents is accomplished while said tubes and associated containers are positioned within said channel so that such tubes need not be removed from the sample tube holder at any time from commencement to completion of the assay.

2. The sample tube holder of claim 1, said frame structure having no walls so that the containers are readily visible within the channels.

3. The sample tube holder of claim 2, said containers having openings formed therein so that the contents of the sample tubes contained therein are readily visible.

4. The sample tube holder of claim 3, said channel being free of obstructions so that said containers may be slideably positioned linearly within said channels in either of the two lineal directions.

5. The sample tube holder of claim 4, said channels being open ended so that said containers may be introduced into or withdrawn from either end of said channels.

6. A method of assaying, comprising the steps of, linearly aligning a plurality of sample tube-receiving containers within at least one elongated channel adapted to slidingly receive said containers, physically grouping said containers toward one end of said channel so that a physical space appears at the other end of said channel, manipulating the contents of the sample tube or tubes nearest the physical space, sliding the tube or tubes the contents of which have been manipulated away from the unmanipulated tubes, into said physical space, thereby causing said space to appear between the manipulated and unmanipulated tubes so that additional records need not be kept as to which tubes have been manipulated and which have not, repeatedly manipulating the contents of the unmanipulated tube or tubes nearest the physical space and sliding the same into the said physical space until the assay is completed.

* * * * *